(12) United States Patent
Machiraju (10) Patent No.: US 7,773,634 B1
(45) Date of Patent: Aug. 10, 2010

(54) ALGORITHMS FOR CONSTRUCTING SETS OF FREQUENTLY OCCURRING STRINGS

(75) Inventor: Sridhar Machiraju, Oakland, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 241 days.

(21) Appl. No.: 11/951,708

(22) Filed: Dec. 6, 2007

(51) Int. Cl.
*H04J 3/00* (2006.01)

(52) U.S. Cl. .................................. 370/476; 370/477

(58) Field of Classification Search ............. 370/252, 370/465, 468, 473, 476, 477
See application file for complete search history.

(56) References Cited

U.S. PATENT DOCUMENTS

| | | | | | |
|---|---|---|---|---|---|
| 4,730,348 | A | * | 3/1988 | MacCrisken | 375/240 |
| 5,701,302 | A | * | 12/1997 | Geiger | 370/521 |
| 5,825,779 | A | | 10/1998 | Putnins et al. | |
| 6,121,903 | A | * | 9/2000 | Kalkstein | 341/63 |
| 6,763,031 | B1 | | 7/2004 | Gibson et al. | |
| 6,856,651 | B2 | * | 2/2005 | Singh | 375/240 |
| 6,909,384 | B2 | | 6/2005 | Baldwin et al. | |
| 6,947,483 | B2 | | 9/2005 | Engwer | |
| 7,275,115 | B2 | * | 9/2007 | Bunn et al. | 709/247 |
| 2005/0047406 | A1 | * | 3/2005 | Hares | 370/389 |
| 2006/0075134 | A1 | | 4/2006 | Aalto et al. | |

OTHER PUBLICATIONS

Machiraju, Sridhar "Optimizing Wireless Networks by Free-Riding on Users".

* cited by examiner

*Primary Examiner*—Ricky Ngo
*Assistant Examiner*—Christine Ng (57) ABSTRACT

Media and methods are provided for constructing data structures associating data segments in packets with reference identifiers to optimize bandwidth usage within a network during transmission. In one embodiment, a data structure is initialized to contain no data. A minimum length of a data segment to be examined is determined. For each packet in the transmission, data segments of the packet are examined. Data segments are added to the data structure as necessary. Examination is repeated along with an appropriate addition until the packet contains less data than a segment of the minimum length and further continued until all packets are examined. The data structure is constructed associating the portions of the packet and respective reference identifiers. In certain embodiments, the count can be a total count of frequently occurring segments, the count of unique segments or the count of packets containing unique segments. In other embodiments, the construction is accomplished by a compression library. In still other embodiments, one or more filtering criteria are added to the process to optimize efficiency. Embodiments are described where packet size, packet source, packet destination or proportion of alpha-numeric characters are used as the filtering criteria.

20 Claims, 6 Drawing Sheets

ALGORITHMS FOR CONSTRUCTING SETS OF FREQUENTLY OCCURRING STRINGS

BACKGROUND

As the number of networks and traffic on networks increase, bandwidth becomes a scarce and valuable resource. The expanding quantity of wireless access points, as an example, creates a need for optimized bandwidth usage. The monetary expense required to establish wired access or the reliability of wireless access points are just two examples of ways in which bandwidth reduction materially affects network topology and performance. End-to-end compression often is not used and does not take advantage of the inter-flow redundancies that can be exploited. Proxy-based solutions do not make use of inter-flow redundancies either. In addition, proxy-based solutions require maintenance of per-flow state and application-awareness. Thus, bandwidth could be more optimally utilized if solutions were available to leverage intra-packet, inter-packet and inter-flow redundancies in a way that is transparent to the end-user and end-user applications.

SUMMARY

The present invention is defined by the claims below. Embodiments of the present invention solve at least the above problems by providing a method and media for, among other things, constructing data structures for use within an in-network compression (INC) scheme. Compression can take place on a per-link basis, or across several hops of a network. The present invention has several practical applications in the technical arts including reducing the bandwidth needed for packet backhaul, reducing the need for installation of wired access and improving performance of wireless access points. Packet boundaries are preserved, however, allowing for transparency to the end user and to the applications generating and receiving the packets. This also allows INC schemes to be implemented in networks with non-INC compliant devices.

In a first embodiment, a method is provided analyzing one or more packets of data to be transmitted in a network in order to construct a data structure for the replacement of frequently occurring data segments. The data structure associates data in portions of the packets with respective reference identifiers in order to reduce a packet size and achieve bandwidth savings during a transmission. A data structure that associates portions of the packets with respective reference identifiers is initialized to contain no data. A minimum length of a portion to be examined is determined. For each packet in the transmission, a portion of the packet is examined. If the portion is not in the data structure, it is added to the data structure. If the portion is in the data structure, an immediately following byte is added to the portion and the examining step is repeated. Examination is repeated along with an appropriate addition until the packet contains less data than a segment of the minimum length. A data structure is constructed associating the portions of the packet and respective reference identifiers.

In a second aspect, a set of computer-useable instructions is provided in order to construct a data structure for the replacement of frequently occurring data segments. The data structure associates the data segments with respective reference identifiers in order to reduce a packet size and achieve bandwidth savings during a transmission. A data structure that associates frequently occurring data segments with respective reference identifiers initially contains no data. A minimum length of a data segment to be examined is determined. For each packet in the transmission, a data segment in the packet is examined. If the data segment is not in the data structure, it is added to the structure. If the data segment is in the structure, an immediately following byte is added to the data segment and the examining step is repeated. Examination is repeated along with an appropriate addition until the packet contains less data than a data segment of the minimum length. The data structure is constructed associating the data segments and respective reference identifiers. Data segment frequency is counted. The data structure is arranged based on the counting.

In a third aspect, a set of computer-useable instructions is provided in order to construct a table for the replacement of frequently occurring data strings in a filtered in-network compression (INC) scheme. The packets contain data. The table associates the data strings with respective reference identifiers in order to reduce a packet size and achieve bandwidth savings during a transmission. A table that associates frequently occurring data strings with respective reference identifiers initially contains no data. A minimum length of a data string to be examined is determined. Packets are examined for a filtering criteria. For each packet in the transmission that meets the criteria, a data string in the packet is examined. If the data string is not in the table, it is added to the table. If the data string is in the table, an immediately following byte is added to the data string and the examining step is repeated. Examination is repeated along with an appropriate addition until the packet contains less data than a data string of the minimum length. The table is constructed associating the strings of frequently occurring data and respective reference identifiers. Data string frequency is counted. The data structure is arranged based on the counting.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide ways for constructing sets of frequently used data to use in an In-Network Compression (INC) scheme. A network operator may implement the systems and methods described below across segments of a network or between each connection in the network at the operator's discretion. The described embodiments add little overhead to the normal operations of upstream or downstream flows. The paper entitled "Optimizing Wireless Networks by Free-Riding on Users" by Sridhar Machiraju is herein incorporated by reference.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In certain embodiments, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to RAM, ROM, EEPROM, flash memory or other memory technology, CD-ROM, digital versatile discs (DVD) or other optical disc storage, magnetic cassettes, magnetic tape, magnetic disk storage, and other magnetic storage devices. These technologies can store data momentarily, temporarily, or permanently.

Figure 1:
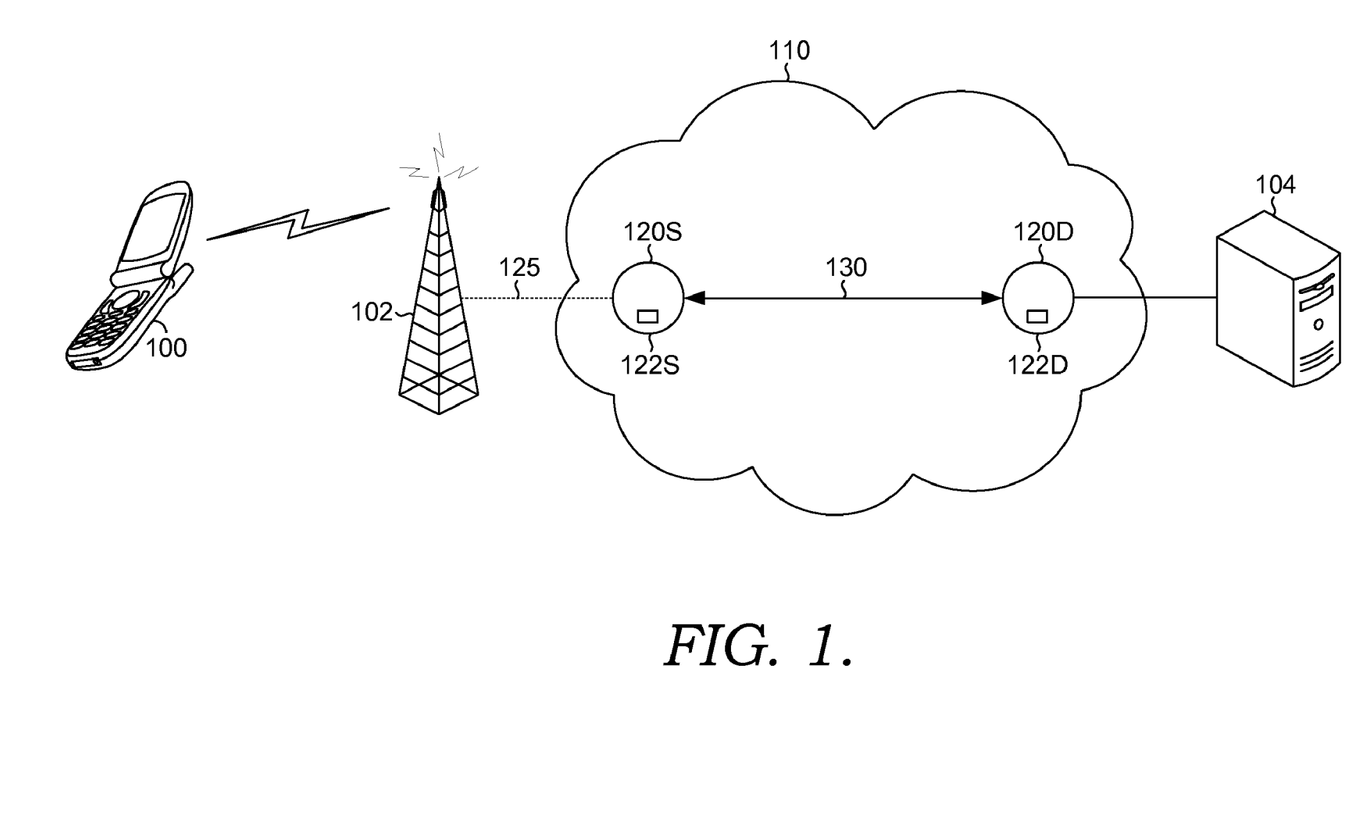
FIG. 1 is an exemplary environment in which certain embodiments of the present invention may be utilized.

It should be understood in the below descriptions and in the figures that like elements are numbered similarly where possible for the sake of clarity. Turning now to FIG. 1, a simplified version of an exemplary network is depicted that connects two devices. A source device 100 is shown that sends and receives data packets from a base transceiver station (BTS) 102. For the purpose of the figure, source device 100 is shown as a cellular phone, however, this is not intended to limit the types of devices that can send data packets to BTS 102. For example, source device 100 could be a personal data assistant (PDA), or a hybrid device that transmits packets for voice and data. Other exemplary devices given for illustration of source device 100 could be a laptop computer or a personal computer. BTS 102 is depicted as a tower and station for receiving cellular phone communications, but again, this is not intended to limit the scope of the invention. BTS 102 alternatively could be an access-point base transceiver station, which is sometimes referred to as a "femto cell," for use in buildings and areas of difficult cellular reception. BTS 102 could also be a Node-B found in a Universal Mobile Telecommunications System/$3^{rd}$ Generation (UMTS/3G) environment. However, BTS 102 does not need to receive cellular signals at all. BTS 102 could be a wireless access point for providing wireless internet access, such as a Wi-Fi hotspot. Also by way of example, BTS 102 could be a wireless router for a home or small business location. BTS 102 may be any type of access point available from a wired internet service provider (ISP) or wireless provider. There are a number of other illustrative examples, but all share the ability to provide access to a network by sending and receiving packet data. Limitation of packets to a single protocol should not be construed, but rather any sort of packet containing data is contemplated. Packets transmitted could be packets using Internet Protocol (IP), Transfer Control Protocol (TCP), User Datagram Protocol (UDP), or any other of a host formats that are currently available or may become available in the future.

The data packets received at BTS 102 are transmitted to a network 110, where it is received by a source node 120S. BTS 120 connects to source node 120S over connection 125. Connection 125 is shown as a dotted line to represent the variable nature of the connection. Source node 120S may alternatively be referred to as an ingress node to denote the entry of data into network 110. Network 110 may be a wireless network or a wired network. The data is transmitted from source node 120S to a destination node 120D across connection 130. Connection 130 may directly connect source node 120S and destination node 120D by a single, wired connection. Connection 130 may connect nodes 120S and 120D with a variable or logical connection. However, connection 130 also may have a number of intermediate nodes between source node 120S and destination node 120D. Other illustrative examples include a virtual private circuit (VPC) or connected networks acting as a single larger network, as may be employed at a large enterprise or university, for example.

Data received at destination node 120D then is transmitted to a destination device 104. Destination node 120D alternatively may be referred to as an egress node, because data is exiting the network. Destination device 104 is illustratively depicted as a server, but could be any number of computing devices. Examples without limitation include web servers, multi-media servers, application servers, voice application servers, databases, personal computers, laptop computers, cellular phones, PDAs, or hybrid voice-data devices. Destination device 104 is shown as connected via a wired connection, however destination device 104 may also be connected wirelessly in a manner similar to source device 100 or in a different manner altogether. Destination device 104 need not be connected directly to network 110 at all, but may be a device on a different network connected either directly or indirectly to network 110. There may be a number of intermediate networks connecting destination node 120D on network 110 and destination device 104.

As one skilled in the art will appreciate, the flow of data between two devices is typically bi-directional. Thus, while source device 100 is shown transmitting data to destination device 104, destination device 104 may also transmit data to source device 100. When the flow of data is reversed, destination node 120D becomes a source or ingress node and source node 120S becomes a destination or egress node. An example is the access of web sites through Hypertext Transfer Protocol (HTTP). Source device 100 both sends and receives data from a destination device 104, which can be a web server for example, using HTTP. Different nodes may be employed when data flows from destination device 104 to source device 100. One ordinarily skilled in the art will also recognize that nodes may be both source nodes and destination nodes capable of sending or receiving data. The equipment available at any given node may vary, but will allow for the reception, transmission, or routing of data packets. Exemplary equipment may include routers, hubs, edge servers, media gateways, residential gateways, switches, or any other equipment used for receiving, routing, and/or transmitting packets. FIG. 1 and source node 120S further includes a data structure 122S, and destination node 120D further includes a data structure 122D. Both data structures will be described in greater detail below. It is understood that nodes 120S and 120D are operating in a session-oriented manner. Thus, the media and methods further described herein require session establishment between the nodes.

Data structure 122S is a data structure that contains frequently occurring data segments, which will alternatively be referred to as a "zeitgeist." The structure also includes reference identifiers that are substituted in packets containing the frequently occurring segments in order to accomplish this INC scheme. Rather than use redundant information inferred from the flow of packets, requiring highly synchronized communication between nodes, explicit zeitgeists are constructed. This allows links that cannot be tightly synchronized, such as two ends of a backhaul connection, the ability to enjoy bandwidth savings. The zeitgeists may be static, or they may be updated periodically. Packets of data arriving at source node 120S are examined to determine if they contain the frequently occurring data segments found in table 122S. Those packets that contain the same data segments have matching segments replaced with respective reference identifiers. After transmission on a connection 130, packets are examined at destination node 120D against data structure 122D to replace reference identifiers with the originally referenced data segments. Thus, it is imperative that the two ends of the connection agree on the zeitgeist in use prior to the transmission. In this way, nodes only compress information that may be inflatable at the receiving node. This may be possible by providing each node an identical zeitgeist prior to transmission, or by transmitting the zeitgeist in use from the sending node to receiving node. Zeitgeists may be constructed on a periodic basis at a single node and transmitted throughout a network.

Connection 130 is shown as a solid line to denote that the connection is direct between the nodes, therefore there is only one link with which the INC scheme is implemented. Because packet boundaries are maintained throughout, though, the users of source device 100 and destination device 104 do not see any differences Likewise, the applications sending and receiving the packets on each device see no difference. This is necessary for networks in which there is no direct connection between hops. It also creates a lossless system of transmitting the packets from hop to hop.

For example, if a large number of packets contain payload information between two specific parties, it may be found that "Kansas City, Mo." and "Burlingame, Calif." are frequently occurring. The data structure may assign <A> and <B> to those strings, respectively. It should be understood that the reference identifier is in someway discernable from the actual letters A and B, so that replacement may take place on the other end of the transmission. Coding schemes such as Huffman coding can be used to decide on a method of coding all individual characters and frequent strings. Also to be understood is that the reference identifier is smaller and therefore transmitting packets with A and B uses less bandwidth than "Kansas City, Kans." and "Burlingame, Calif." After transmitting the compressed, i.e. smaller, packets to a destination node, packets are re-examined. A and B are re-replaced by "Kansas City, Kans." and "Burlingame, Calif." Destination node then has complete packets to transmit to destination device 104.

Therefore, as an example, if twenty (20) percent of the packets' payloads constitute data that is frequently occurring, and it may be replaced with reference identifiers taking up one-fourth of the amount of space, fifteen (15) percent of the bandwidth needed to transmit the entire packet may be saved. Preserving the boundaries of these variable-size packets allow smaller overall packets to be transmitted. For that reason, performance can be improved. The compression and inflation can be of tremendous value across any single link under bandwidth constraints as well as for a significant network with many hops and connections. Likewise, financial savings could be realized for operators being charged exclusively by the amount of information transmitted across another network.

Figure 2:
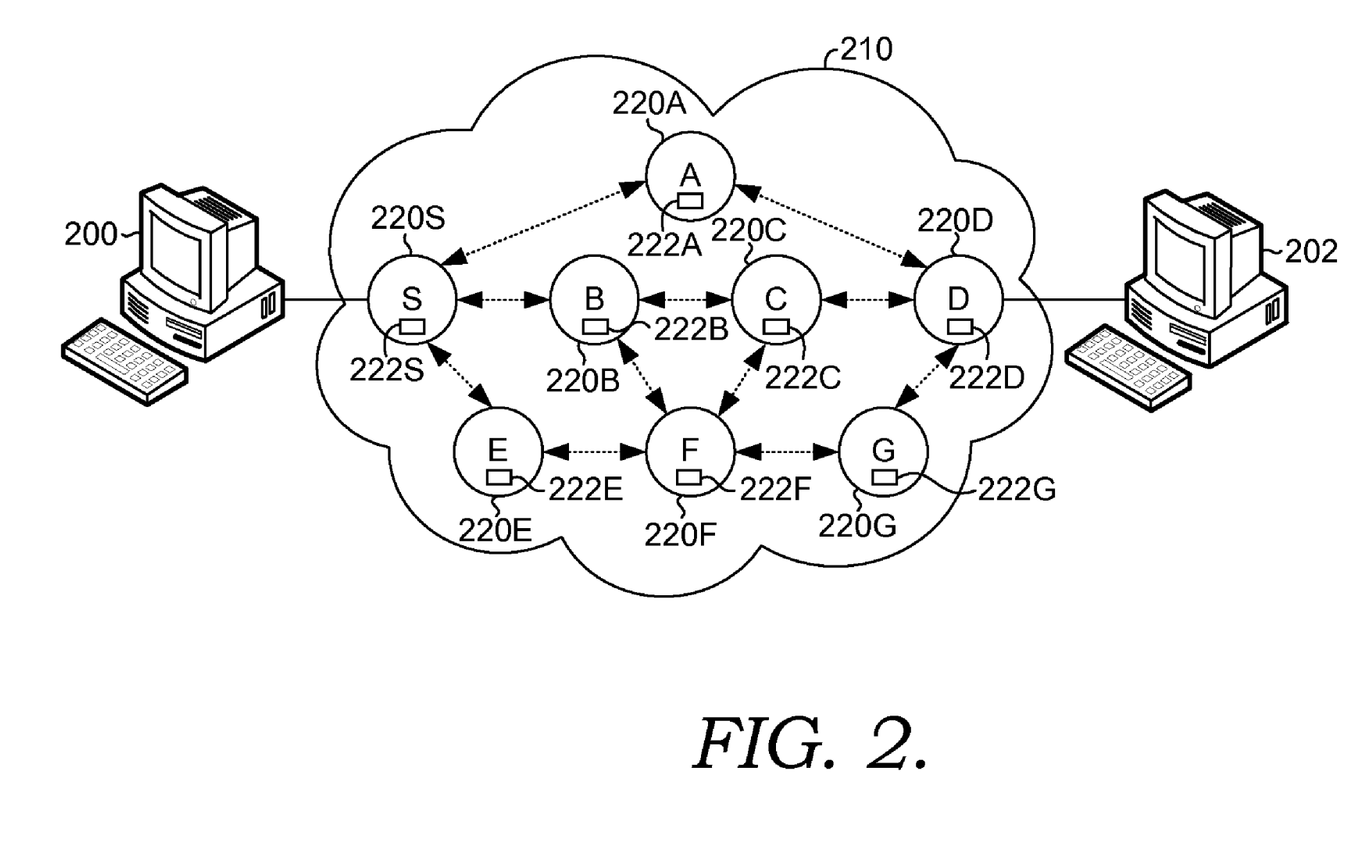
FIG. 2 is an alternative exemplary environment in which embodiments of the present invention may be utilized.

An architecture using an INC scheme involving a larger number of nodes, that is a multiple-link topology, is depicted in FIG. 2. A personal computer 200 is shown as a source device and a personal computer 202 is depicted as a destination device. A network 210 is depicted that contains a source node 220S and a destination node 220D. Source node 220S also includes a structure 222S and destination node D includes a structure 222D. However, network 210 is shown to have nodes 220A, 220B, 220C, 220E, 220F, and 220G as well. Corresponding data structures 222A-C and 222E-G are depicted in the network.

As a result of the increased complexity and added elements, a single connection from source node 220S to destination node 220D does not exist in network 220. Rather, a series of connections or links can be made between the plurality of nodes in order to transmit a packet from source node 220S to destination node 220D. For this reason, the connections shown in FIG. 2 use dotted lines and are not numbered. Using initials to denote their respective nodes, packets can be routed through SAD, SBCD, SEFGD, SBFCD, SBFGD, SEFCD, or SBCFGD in order to travel from source node 220S to destination node 220D. It should be understood that in instances other than the present exemplary case, any node could be a possible destination or a possible source, with packets transmitted between any of the remaining plurality of connected nodes. The number of nodes, interconnections and plausible routes are intended to be illustrative in nature without limiting the scope of the present invention. A network could have thousands of nodes and millions of routes, if not more, while still falling within the intended scope of the present invention.

Using an INC scheme covering multiple links, coordination of data structures 220S, 220D, 220A-C, and 220E-G becomes more complex, but allows for greater flexibility. Several examples may illustratively provide solutions contemplated within the scope of the present invention, but this should not be construed that solutions not explicitly disclosed are outside of the present invention's scope. For example, a structure 222S may be a zeitgeist constructed at source node 220S and a copy sent to every node prior to any transmission on network 210. Another example would be the transmission of data structures on a per-link basis. Finally, a method of checking the data structures located at upstream nodes could determine if the data structures are identical. Identical structures at each node would mean compression at source node 220S and inflation at destination node 220D. On the other hand, if a data structure upstream was not identical, inflation would occur at the link prior to any difference.

Figure 3:
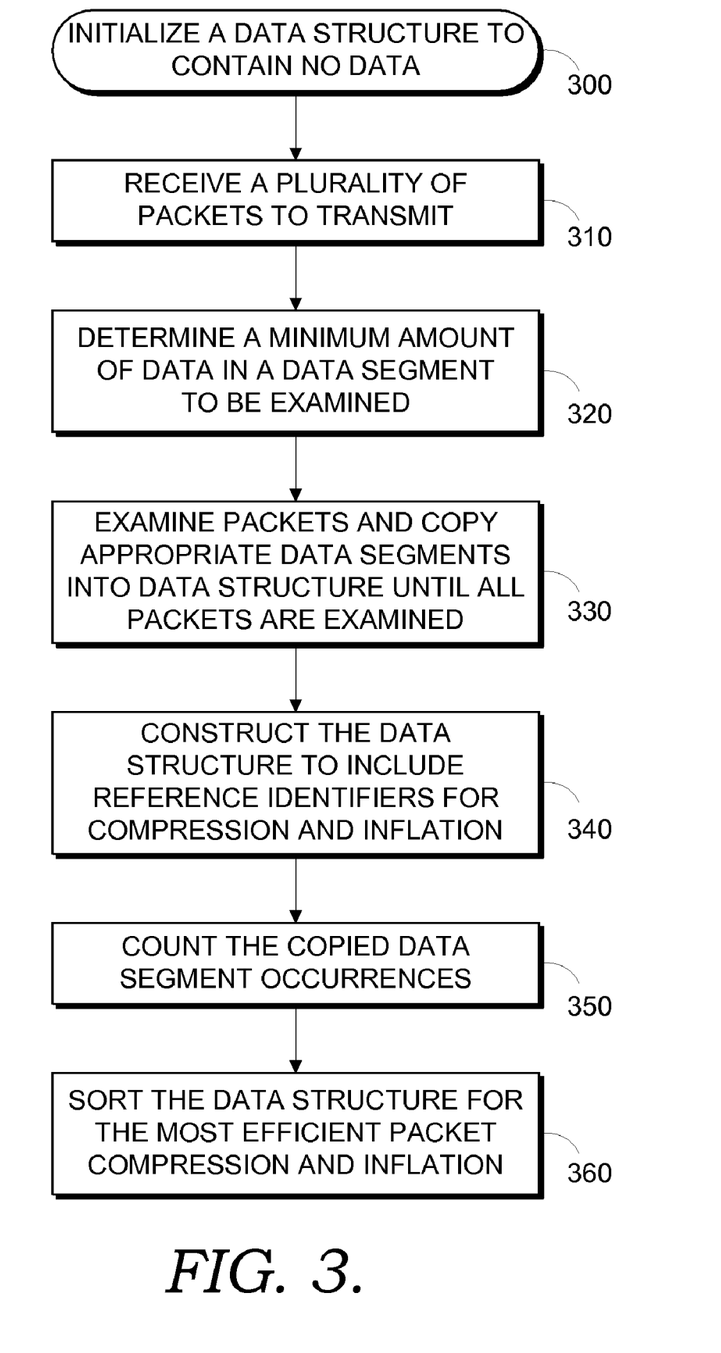
FIG. 3 is a flowchart outlining a method of constructing a data structure to associate portions of packets with reference identifiers in order to achieve bandwidth savings.

Turning now to FIG. 3, a flowchart outlining a method of constructing a data structure to associate portions of packets with reference identifiers, i.e. a zeitgeist, is given. A compression library will be used to carry out the steps of the following methods and media. An exemplary compression library is the Zlib library available at www.zlib.net. For example, this could be Zlib version 1.2.3 released Jul. 18, 2005. This compression library is not intended to limit the present invention, but merely to provide an example of a suitable library capable of the necessary compression and inflation operations. The use of any compression technique that accepts explicit dictionaries is equally suitable. Zlib refers to its reference identifiers as back-pointers, but back-pointers should be understood to describe a specific implementation of a generic reference identifier. Zlib uses fewer bytes to represent frequent data segments. This can alternatively be described as a smaller back-pointer "offset," and this smaller offset allows for more efficient compression and inflation of packets.

At a step 300, the data structure is initialized so that the structure is empty. The empty data structure will eventually contain the zeitgeist. Packets that are to be transmitted in the network are received at a step 310. In the exemplary environments described above, this could be the reception of packets at source node 120S or at source node 220S. As described above, nodes may have the ability to transmit or receive packets, so the packets could be received at any capable node on the network. It will be understood that the packets receive data that can be divided into portions, segments or strings. Each term can be used synonymously, although for clarity sake the term data segment will be used in these descriptions. At a step 320, a minimum amount of data in the data segment is determined, which will be represented by the variable m. In the example of using Zlib compression, a four-byte segment is typically the smallest data segment for which bandwidth savings can be achieved. In other compression libraries, a different minimum that is larger or smaller may be required.

Figure 4A:
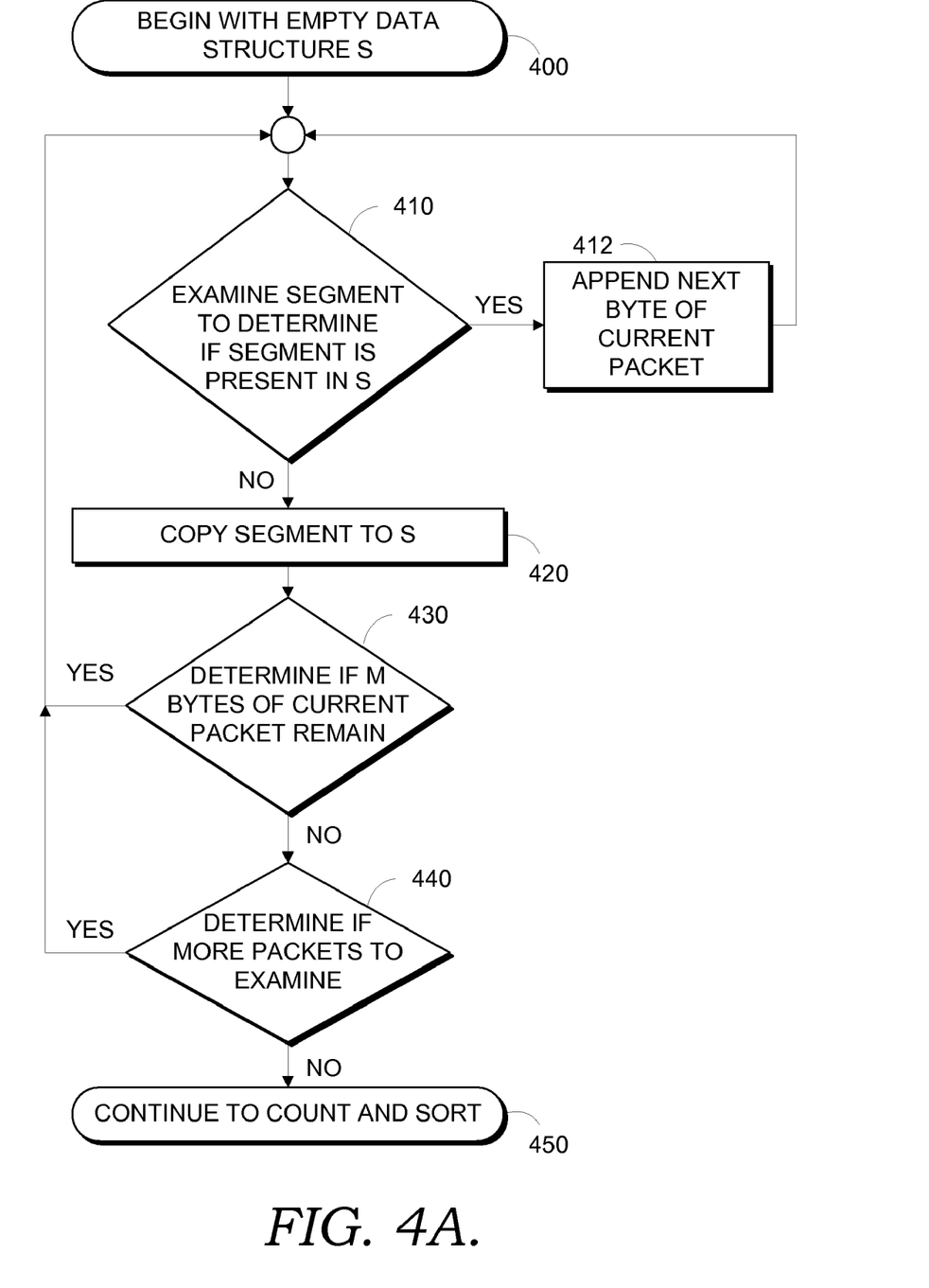
FIG. 4A is a flowchart showing a first phase of an embodiment of the present invention, whereby data is examined for entry into a data structure.

Continuing with FIG. 3, at a step 330, the packets are examined and data segments are copied into the data structure until all packets are examined. The examination and data structure construction process are described in further detail in FIG. 4A below. At a step 340, construction of the data structure is completed to include the data segments and, if necessary, the reference identifiers. In the example of Zlib, only the data segments need to be specified. The reference identifiers are automatically constructed using Huffman coding and need not be specified in the data structure. The data segments are counted at a step 350, a method of which is further described at FIG. 4B. Once the count is completed, the data structure is sorted so that the compression and inflation can occur in an efficient manner.

As described above, the data structure construction utilized by the present invention is an explicit zeitgeist, in order to avoid a need for synchronization. Now turning to the flowchart of FIG. 4A, a first stage constructing a precursory superset to the zeitgeist is shown. At a step 400, an empty data structure "S" is available. At a step 410, a segment of data is examined to determine if it is present in S. If the segment is not already copied to the superset, it is copied at a step 420. If it is already in the superset, the following byte is appended to the segment and step 410 is repeated. Once a segment is copied to the superset at step 420, a determination is made whether a segment longer than m bytes remains in the current packet. If such a segment is contained in the packet, a return to step 410 is in order. If there is not enough data remaining to constitute a minimal data segment, the examination continues if there are remaining packets, seen at a step 440. If it is determined that there is a next packet, steps 410, 412, 420, and 430 are repeated as necessary. If no packets remain, then a step 450 ends the examination phase.

Figure 4B:
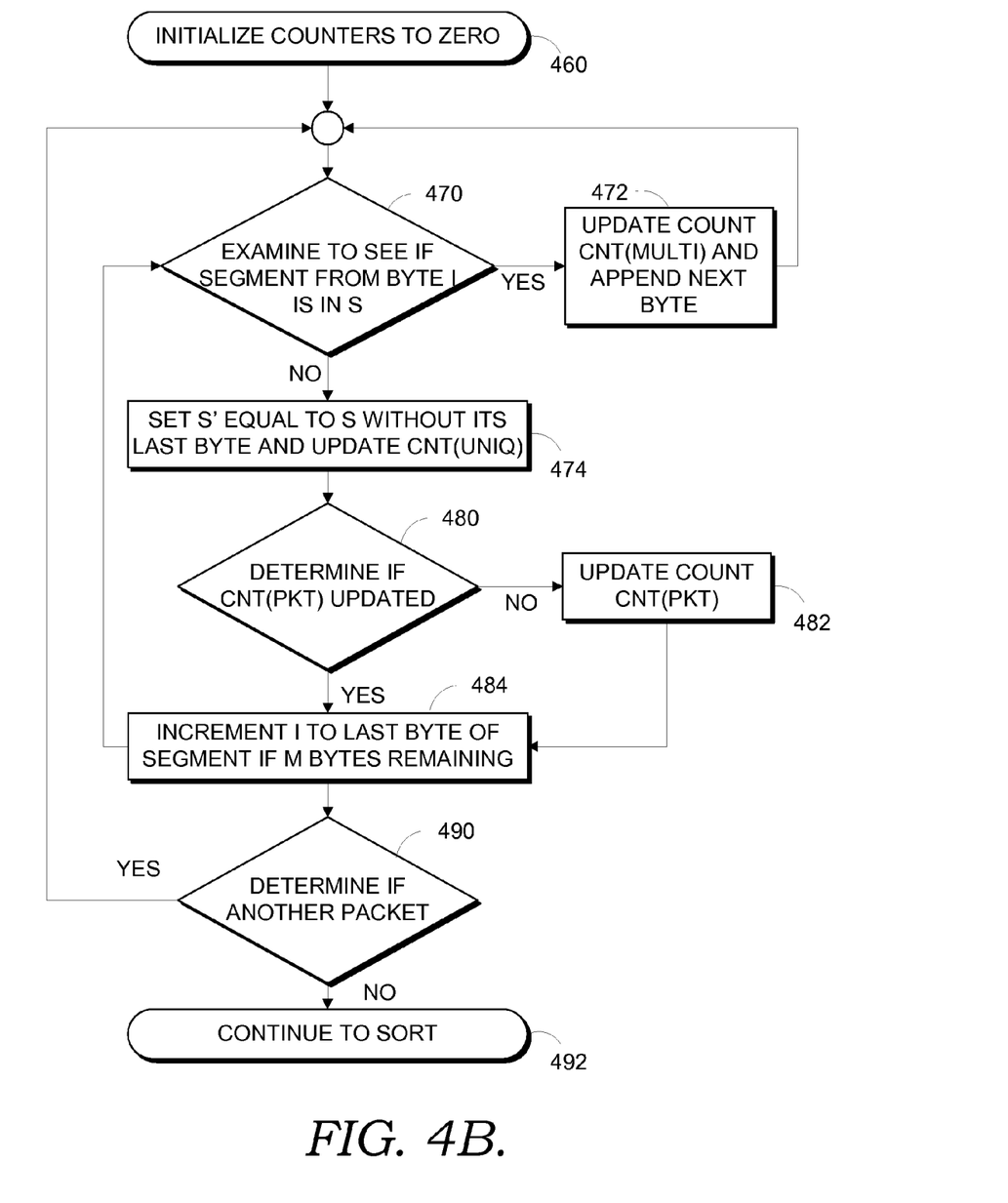
FIG. 4B is a flowchart showing a second phase of an embodiment of the present invention, whereby entries into a data structure are counted to achieve greater efficiency in packet compression and inflation.

Turning to FIG. 4B, a flowchart depicts the second phase of an embodiment of the present invention. The second phase begins at a step 460, when a set of three counters, $cnt_{multi}$, $cnt_{uniq}$ and $cnt_{pkt}$, are initialized to zero. The counters record three different types of data segments that may be found in the packets. The count for $cnt_{multi}$ is the total number of occurrences of a data segment. This is the most intuitive measure, because it is a simple total. The count tabulated in $cnt_{uniq}$ is the number of times a segment occurs as a longest segment not occurring elsewhere, or unique occurrences. This is less intuitive, but more helpful in optimizing replacement. For example, if "day" by itself occurs 10 times, "Friday" occurs two times, and "Saturday" occurs two times, then the total count of the segment "day" would be 14. However, the unique count would be the 10 times it occurs without being part of a larger segment, e.g. Friday or Saturday. The final tally, $cnt_{pkt}$, is the number of packets in which the unique count occurs. The utility in using all three counts will be discussed more below.

Continuing with FIG. 4B., a variable, i for this illustration, is set as the current byte to examine in a packet. At a step 470, a segment from i to i+m−1, which will be denoted as s, is examined to see if it is in superset S. If s is in S, then the count for $cnt_{multi}$ is updated at a step 472, the next byte is appended to the segment, and the process returns to step 470. If s is not in S, then at a step 474 a segment s' is created, which is s without its last byte. The unique count is updated at step 474 as well. At a step 480, a determination is made on the need to update $cnt_{pkt}$. If the count has not been updated for the current packet yet, that count is updated at a step 482. If it has already been updated previously while analyzing the current packet, the process moves to a step 484. The value of i shifts to the last byte of the segment and examination is repeated at step 470. This continues until there is no longer a segment greater than m in the packet.

Once the packet has been examined, a determination is made at a step 490 if another packet should be examined. If there is another packet to examine, the process again returns to 470. The process continues returning to step 470 until there are no more packets to examine. Once step 490 is completed without another packet to examine, the second phase is complete at a step 492. At step 492, the counting of data segments is complete and the data structure is transformed by any number of sorting mechanisms in order to effectuate the optimal sorted zeitgeist. The sorting mechanism will not be described herein because there are a number of ways it can be accomplished. Sorting may be done with respect to any of the counters discussed earlier. However, the important concept is that the sorting can allow more efficient replacement of data segments through the elimination of sub-segments. A sub-segment that is present in other segments will not need replacement if the sorting removes the longer segment first. Thus, sorting so that the most frequently occurring segments are last optimizes the compression achieved by reducing what must be replaced and by shortening the back-pointer length.

Figure 5:
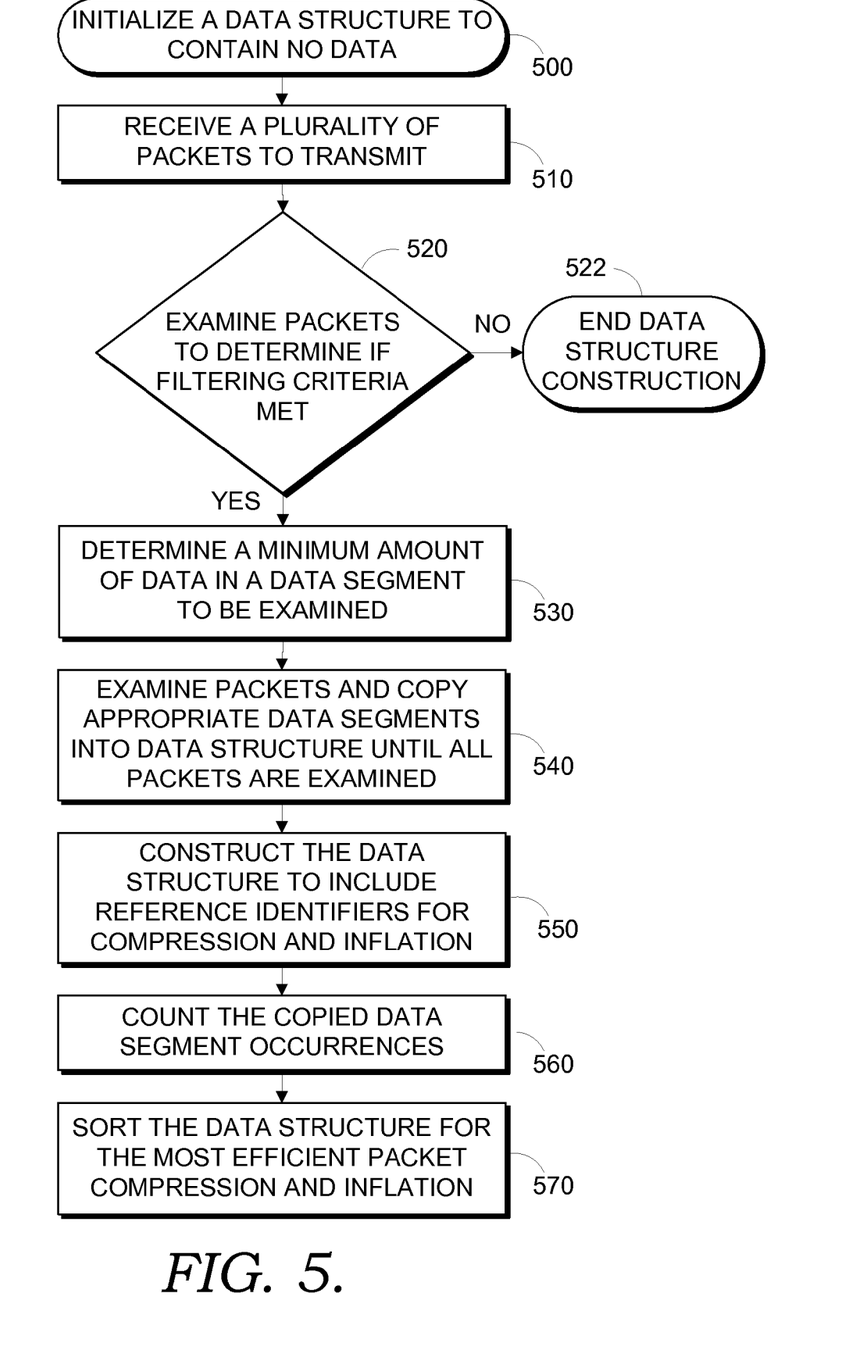
FIG. 5 is a flowchart outlining an optimized method of associating portions of packets with reference identifiers in order to achieve bandwidth savings by employing a filtering criteria.

Turning now to FIG. 5, an alternative embodiment is shown in a flowchart. At a step 500, a data structure is initialized to contain no data as was seen in other embodiments. A plurality of packets in need of transmission are received at a step 510. At a step 520, the packets are examined to see if a filtering criteria is met. Packets with very little data generally cannot achieve very much in the way of savings through compression. Some packets may even become larger through compression, e.g., if a packet has no data and then is compressed anyway. In order to avoid unnecessary compression, a criteria is selected to make sure compression is appropriate. For example, total packet size may be used. Other examples of criteria that can be established are a packet source, a packet destination, or a proportion of alpha-numeric characters present. If there are no packets that require compression, there is no need to construct a structure and the process ends at a step 522. If there are packets that can achieve savings through compression, the data structure construction continues at a step 530. The process then looks very similar to the method of FIG. 3. A minimum data amount to be examined is determined at step 530. At a step 540, the packets are examined and copied as appropriate to a data structure until are packets are examined. The data structure is constructed at a step 550, a count is taken at a step 560, and the structure is sorted at a step 570. The resulting zeitgeist is then available for in-network compression as previously discussed.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of generating sets of frequent strings in one or more packets and associating the sets with respective reference identifiers, in order to achieve bandwidth savings during a transmission within a network, the method comprising:
   initializing a data structure, wherein the data structure initially contains no data;
   receiving the one or more packets to be transmitted, wherein the contents of each packet in the one or more packets are data;
   determining a minimum amount of data in the one or more packets to be examined;
   for each of the one or more packets to be transmitted,
   (1) examining a portion of a packet equal to or longer than the minimum amount;
   (2) if the portion is not in the data structure, copying the portion to the data structure;
   (3) if the portion is in the data structure, adding a byte that immediately follows the portion to the portion and repeating steps (1)-(2); and
   (4) repeating steps (1)-(3) for any subsequent portions of the packet until the packet contains less data than the minimum amount; and
   constructing the data structure to associate copied portions in the data structure with respective reference identifiers.

2. The method of claim 1, further comprising determining a count of the copied portions in the data structure.

3. The method of claim 2, further comprising sorting the copied portions and reference identifiers in the data structure to facilitate the most efficient use of the copied portions.

4. The method of claim 3, wherein the sorting is based on the count.

5. The method of claim 4, wherein the count is a total number of occurrences in the one or more packets of the copied portions in the data structure.

6. The method of claim 4, wherein the count is a total number of occurrences in the one or more packets of the copied portions in the data structure that are not a sub-portion of a longer portion of data.

7. The method of claim 4, wherein the count is a total number of packets in which the copied portions in the data structure are not a sub-portion of a longer portion of data.

8. One or more tangible non-transitory computer-storage media having computer-executable instructions embodied thereon enabling construction of a data structure that reduces network bandwidth usage, the media performing a method comprising:
   receiving a transmission of one or more packets containing data, wherein the data can be divided into one or more segments;
   initializing a data structure with no segments of data initially contained therein;
   determining a minimum amount of data to be examined;
   for each of the one or more packets in the transmission,
   (1) examining a data segment in a packet;
   (2) appending the data segment to the data structure if the data segment is not in the data structure;
   (3) adding an immediately following byte to the data segment and repeating the steps (1)-(2) if the data segment is in the data structure; and
   (4) repeating steps (1)-(3) until the packet contains less data than a data segment of the minimum amount of data;
   implementing a count of the number of data segments appended;
   organizing an arrangement of the data segments within the data structure based on the count; and
   associating the data segments in the data structure with respective reference identifiers based on the arrangement.

9. The media of claim 8, wherein the data structure is a relational table.

10. The media of claim 8, wherein steps (1)-(4) are executed by a compression library.

11. The media of claim 8, wherein the count is a number of occurrences of appended data segments.

12. The media of claim 8, wherein the count is a number of occurrences of appended data segments that are not sub-segments of larger data segments.

13. The media of claim 8, wherein the count is a number of packets in which the appended data segments are not a sub-segment of a larger data segment.

14. The media of claim 8, wherein the organizing produces an arrangement of optimal efficiency, whereby the arrangement varies from a smallest count of data segments to a largest count of data segments.

15. The media of claim 13, wherein the organizing produces an arrangement of optimal efficiency, whereby the arrangement varies from a smallest count of data segments to a largest count of data segments.

16. One or more non-transitory computer-storage media having computer-executable instructions embodied thereon for performing a method of constructing a table for use in a filtered in-network compression (INC) scheme, the scheme using a filtering criteria, one or more packets and the table, and wherein the scheme replaces one or more data strings in one or more packets with a respective reference identifier to reduce the size of the packet and achieve bandwidth savings during a transmission, the method comprising:
   initializing a table with no strings of data contained therein;
   determining a minimum length of data to be examined;
   examining a packet for one or more filtering criteria;
   for each packet in the transmission that meets the filtering criteria,
   (1) examining a data string in the packet;
   (2) copying the data string to the table if the data string is not in the table;
   (3) adding an immediately following byte to the data string and repeating the examining step if the data string is in the table; and
   (4) repeating steps (1)-(3) until the packet contains less data than the minimum length;
   counting the frequency of the data strings;
   arranging the data strings based on the counting; and constructing the table associating the data strings and respective reference identifiers based on the arranging.

17. The media of claim 16, wherein the filtering criteria is at least one of a total packet size, a packet header source address, a packet source destination address, and a packet's proportion of alpha-numeric characters.

18. The media of claim 17, wherein steps (1)-(4) are executed by a compression library.

19. The media of claim 18, wherein the counting is a total number of packets in which the data string is not a subset of a larger string of data.

20. The media of claim 19, wherein the arranging organizes the data strings in an optimal order, from a smallest frequency to a largest frequency.

* * * * *